United States Patent [19]

Kao

[11] Patent Number: 4,998,243

[45] Date of Patent: Mar. 5, 1991

[54] ISDN TERMINAL ADAPTER WITH TELECONFERENCE PROVISION

[75] Inventor: Ming-Luh Kao, Miami, Fla.

[73] Assignee: Racal Data Communications Inc., Sunrise, Fla.

[21] Appl. No.: 419,234

[22] Filed: Oct. 10, 1989

[51] Int. Cl.$^5$ .......................... H04J 3/12; H04M 3/42
[52] U.S. Cl. .................................... 370/62; 370/110.1;
370/85.1; 379/202; 379/94
[58] Field of Search .................. 370/62, 110.1, 85.1,
370/60; 178/71 R, 71 B; 379/157, 158, 201,
202, 229, 230, 94, 96, 203, 204, 93

[56] References Cited

U.S. PATENT DOCUMENTS

| | | | |
|---|---|---|---|
| 4,301,531 | 11/1981 | Lubin | 370/62 |
| 4,656,623 | 4/1987 | Dalby, Jr. et al. | 379/96 |
| 4,656,625 | 4/1987 | Nojiri et al. | 370/62 |
| 4,661,969 | 4/1987 | Butler et al. | 379/203 |
| 4,722,082 | 1/1988 | Furuya et al. | 370/110.1 |
| 4,792,800 | 12/1988 | Fujioka et al. | 370/110.1 |

FOREIGN PATENT DOCUMENTS 0010855 1/1988 Japan ........................ 379/202

Primary Examiner—Douglas W. Olms
Assistant Examiner—Alpus H. Hsu
Attorney, Agent, or Firm—Jerry A. Miller

[57] ABSTRACT

A device for providing teleconference capabilities in an ISDN includes a first receiver for receiving a first signal representing a first message over a first ISDN B-channel. A second receiver receives a second signal representing a second message over a second ISDN B-channel. A receive mixer mixes the first signal with the second signal to produce a receive mixed signal. A local receiver receives a local signal representing a local message to be transmitted over the first and second ISDN B-channel. A first transmit mixer mixes the first signal with the local signal to produce a first transmit mixed signal. A first transmitter transmits the first transmit mixed signal over the second ISDN B-channel. A second transmit mixer mixes the second signal with the local signal to produce a second transmit mixed signal. A second transmitter transmits the second transmit mixed signal over the first ISDN B-channel.

7 Claims, 3 Drawing Sheets

ISDN TERMINAL ADAPTER WITH TELECONFERENCE PROVISION

BACKGROUND

1. Field of the Invention

This invention relates generally to the field of Integrated Services Digital Network (ISDN) Terminals or Terminal Adapters (TA) and more particularly to an ISDN terminal or terminal adapter which includes a provision for providing teleconferencing (conference call) by utilizing a daisy chain switching and summing arrangement at the terminal or terminal adapter as a conference bridge.

2. Background of the Invention

Conventional teleconference arrangements are based on a centralized conference bridge architecture. A central processor situate at the hub location of a star network performs all of the switching and mixing functions required to conduct a conference. Of course, for such a network to operate, the central processor must be able to provide such function. Since this is often out of the control of the end user and often results in a special charge, this arrangement may be disadvantageous in some networks.

Another conference arrangement is the so called "hot and holler" circuit. This arrangement is essentially a private line multi-drop analog circuit which permits one way voice broadcast. This arrangement has similar drawbacks.

With the emergence of ISDN, a 2B+D basic rate service (two B Bearer channels and a packetized D signaling channel) will eventually be widely available. The present invention provides a flexible and inexpensive alternative to more conventional techniques which has the advantage of being controlled by the users terminal or terminal adapter. For purposes of this document, the term "terminal adapter" is intended to embrace devices performing conventional terminal or terminal adapter functions as well as telephone sets, terminals and the like which have the functionality of a conventional terminal adapter, i.e. 2B+D interface and multiplexing and the like, built in even though such devices may not provide some of the functions of a conventional terminal adapter (such as conversion to RS-232 for connection to non-ISDN type equipment).

SUMMARY OF THE INVENTION

It is an object of the present invention to provide an arrangement for providing conference calls in an ISDN.

It is another object of the present invention to provide teleconference capability within an ISDN terminal adapter.

It is an advantage of the present invention that the bridging function is distributed within the terminal adapters of the network.

It is another advantage that a virtually unlimited number of parties can be coupled together without concerns about impedance matching and loading.

These and other objects and advantages of the invention will become apparent to those skilled in the art upon consideration of the following description of the invention.

In one embodiment of the present invention a device for providing conference capabilities in an ISDN includes a first receiver for receiving a first signal representing a first message over a first ISDN B-channel. A second receiver receives a second signal representing a second message over a second ISDN B-channel. A receive mixer mixes the first signal with the second signal to produce a receive mixed signal. A local receiver receives a local signal representing a local message to be transmitted over the first and second ISDN B-channel. A first transmit mixer mixes the first signal with the local signal to produce a first transmit mixed signal. A first transmitter transmits the first transmit mixed signal over the second ISDN B-channel. A second transmit mixer mixes the second signal with the local signal to produce a second transmit mixed signal. A second transmitter transmits the second transmit mixed signal over the first ISDN B-channel.

In a method of implementing a conference call in an ISDN terminal adapter includes the steps of: providing a first terminal adapter with access to first and second communication channels, the first terminal adapter being coupled to a first source of information which produces first information; creating a logical connection to a second terminal adapter over the first communication channel, the second terminal adapter being coupled to a second source of information which produces second information; creating a logical connection to a third terminal adapter over the second logical channel, the third terminal adapter being coupled to a third source of information which produces third information; mixing the second information received over the first communication channel with the first information; transmitting the mixed second and first information over the second communication channel; mixing the third information received over the second communication channel with the first information; transmitting the mixed third and first information over the first communication channel; mixing the second and third information received over the first and second channels respectively together and providing the mixed second and third information to the first source of information.

In the present invention an ISDN terminal or terminal adapter with provision for implementing conference calls includes a fist interface for interfacing with a first B channel. A second interface interfaces with a second B channel. A third interface interfaces with a terminal. A conference bridge couples signals from the first B channel with signals from the second B channel and the terminal to provide an exchange of signals among at least three parties.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
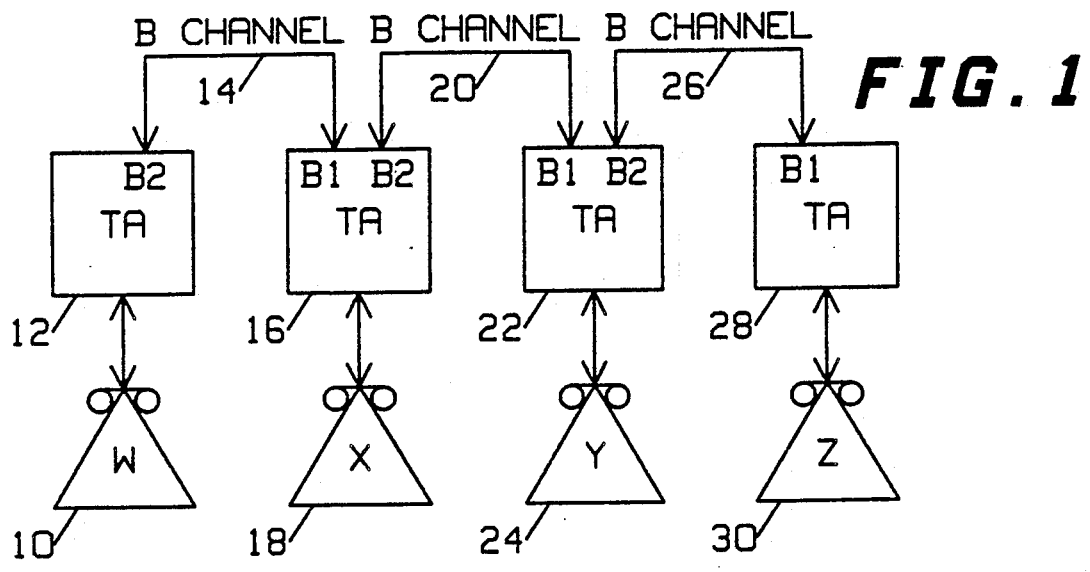
FIG. 1 is a block diagram showing the overall concept of the daisy chain teleconference arrangement of the present invention.

Turning now to FIG. 1, the basic concept of the present invention is illustrated. In this example, four telephone sets W, X, Y and Z are coupled together in a teleconference arrangement according to the present invention via the two logical B channels of the ISDN. In basic rate ISDN, two B channels (B1 and B2) and a D channel are actually multiplexed together over a single set of transmission lines. However, the logical channel connections shown in the drawings are more illustrative of the daisy chaining of the present invention. For simplicity, the logical B channels have been illustrated as direct connections between the terminal adapters, but those skilled in the art will understand how the terminal adapters actually interface to the ISDN to provide such logical connections through the network.

In this figure, a telephone set 10 (telephone set W) is connected to a terminal adapter 12. This terminal adapter 12 is coupled through one of its logical B channels 14 to a second terminal adapter 16 which is in turn connected to a second telephone set 18 (telephone set X). During the call setup, telephone set 18 makes the connection to the next telephone set in the daisy chain via its second B channel 20 to terminal adapter 22. Terminal adapter 22 is connected to a third telephone set 24 (telephone set Y). Thus far, terminal adapter 16 is acting as teleconference bridge among telephone sets 10, 18 and 24 and adds or mixes the signals from all three telephone sets appropriately so that each user can hear the other.

To establish the next link in the daisy chain, telephone set 24 places a call through terminal adapter 22 via its second B channel 26 to terminal adapter 28 and thus to the fourth telephone set 30 (telephone set Z). This completes the conference connection among all four telephone sets.

Figure 2:
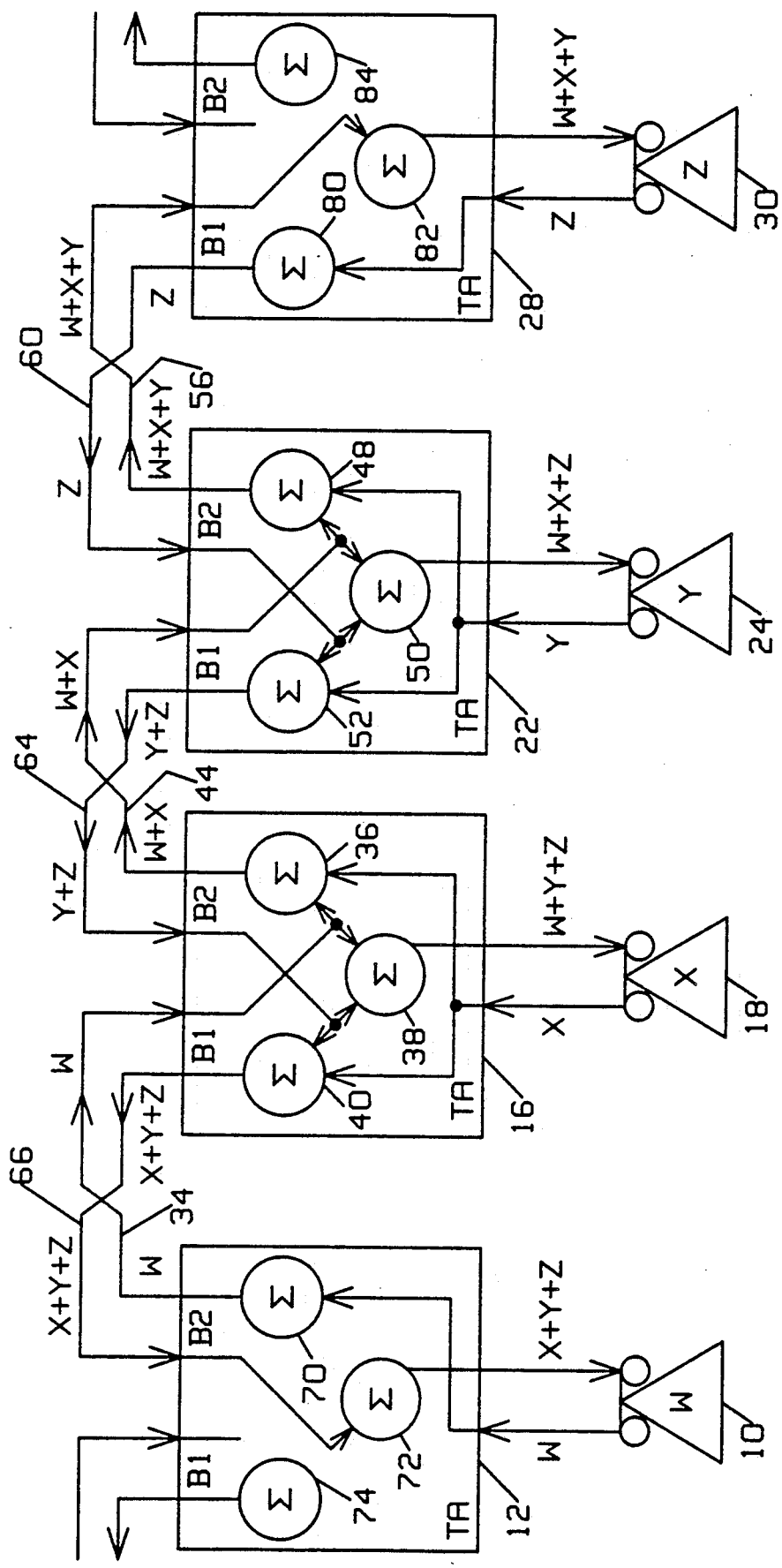
FIG. 2 shows a more detailed diagram of the daisy chain teleconference arrangement of FIG. 1.

Turning now to FIG. 2, a more detailed drawing of the daisy chain arrangement of FIG. 1 is shown. In this drawing, the logical B channels are once again simplified for clarity, but show both inbound and outbound lines to facilitate discussion of the signal flow. Also, the necessary switching and normal terminal adapter functions such as transmitter and receiver, etc. have been omitted for clarity since this figure is intended to illustrate the summation of the various voice signals. For purposes of this discussion, the terms summation and mixing and related terms are used synonymously and interchangably to refer to summation of two or more signals so that both signals coexist on the same circuit node. This can be accomplished by analog techniques (e.g. a summing amplifier or audio mixer) or by digital techniques which are equivalent or by combinations of the two approaches.

In the preferred embodiment, the mixing or adding function is provided by using a digital adding circuit. This circuit can be implemented via dedicated hardware or by a programmed processor. In either event, digital PCM signals received over the B1 and B2 channels by a terminal adapter are added sample by sample to produce a binary sum which may then be converted to analog for transmission to the telephone set for conversion to audio. In this digital embodiment, as well as some analog embodiments, it will be appreciated that there may be instances where more than one party is talking simultaneously for brief periods of time (usually only during brief interruptions and the like). In this event, it may be possible for the adders to reach maximum positive or negative output values and producing clipped speech. Since it is anticipated that these instances will be brief and a relatively small percentage of the actual conference time, it is not believed to be a serious problem. This is especially the case since clipping of the peaks of band limited speech signals often results in little loss of intelligibility. Several mechanisms can be devices to partially or fully compensate for this minor problem if required. For example, dynamic range compression techniques can be used with expansion being appropriately scaled to prevent clipping. Or, for example in a 16 bit system, 15 bits of dynamic range can be allocated per signal to allow the additional bit of range to be used as "headroom" the summation for times when more than one signal peak occurs simultaneously. Other compensation methods may occur to those skilled in the art; however, as stated previously, it is not believed to be a serious enough problem to warrant concern in most circumstances.

Referring to FIG. 2, the outbound signal from telephone set 10 carries signal "w" through terminal adapter 12 and out of the outbound path of B2 channel 14 of terminal adapter 12 shown as 34. This "w" signal is received by terminal adapter 16 via its B1 channel and applied to mixers 36 and 38 therein. The signal "x" from telephone set 18 is applied to mixers 36 and 40 within the terminal adapter 16. Mixer 36 produces the output signal "w+x" at its output which is directed to an outbound path 44 of B channel 20. Terminal adapter 22 receives the "w+x" signal from path 44 whereupon it is applied to mixers 48 and 50. The "y" signal from telephone set 24 is also applied to mixer 48, as well as mixer 52. In mixer 48, the "y" signal is added to the "w+x" signal to produce a signal "w+x+y" which is shipped out over an outbound path 56 of B channel 26. This "w+x+y" signal is received by terminal adapter 28 and passed on to telephone set 30. In this manner, the signals from each of the other parties W, X and Y are combined successively in a daisy chain fashion so that they are all received by telephone set 30.

In a similar manner, the outbound "z" signal from telephone set 30 is transmitted over path 60 to terminal adapter 22 where it is applied to mixers 50 and 52. The "z" signal is mixed with the "y" signal in mixer 52 and transmitted to terminal adapter 16 over path 64 as "y+z". In terminal adapter 16, the "y+z" signal is further mixed with signal "x" at mixer 40 to produce signal "x+y+z". This signal is transmitted over path 66 to terminal adapter 12 wherein it is delivered to telephone set 10. Thus, the signals "x", "y" and "z" are combined and provided to telephone set 10.

At telephone set 18, an intermediate telephone set in the daisy chain, mixer 38 is used to combine signal "w" with signal "y+z" to provide telephone set 18 with the signals from the other parties to the conference call. In a similar manner, mixer 50 combines signals "w+x" with signal "z" to provide telephone set 24 with the signals from the other parties to the conference call. Thus each four parties, in this example, are provided with the signals produced by the other three parties.

Terminal adapter 12, which is at the left end of the chain, is shown to include mixers 70, 72 and 74 which operate in a manner analogous to that of mixers 36, 38 and 40 respectively of terminal adapter 16. In the embodiment shown, signal "w" is shown passing through mixer 70 but is essentially unaffected because, due to internal switching within terminal adapter 12, there is no signal present at mixer 70 to add to signal "w". Similarly, no signal is added to signal "x+y+z" in mixer 72 since terminal adapter 12 is at the end of the chain. Equivalently, the signals could bypass the respective mixers in terminal adapter 12 without departing from the invention. Analogous statements apply to terminal adapter 28 with regard to mixers 80, 82 and 84. The two B channel paths for the second B channels which are unused (or used for purposes other than teleconference) are shown coupled to terminal adapters 12 and 28 for completeness.

While the above example shows a four party conference, it is clear that the number of parties involved is essentially unlimited. Since the signals are coupled with distributed daisy chain bridges, there are no significant loading problems or impedance matching issues. It is also noted that the parties at the end of the chain need not have the present conference capability and in fact need not even be part of an ISDN per se. They only need to be able to be called by parties on the ISDN (e.g. a conventional telephone set may be party to the conference).

During operation, if a party at one of the intermediate nodes leaves the conference, several possibilities exist. The actual operation of the terminal adapter depends upon the desired implementation of the present invention. If an intermediate party leaves the conference, it is evident that in the absence of some special action, one of two things will happen: (1) the intermediate TA will have both channels occupied prohibiting the user from using his telephone, or (2) the conference call will be segmented into two parts due to the calls being torn down at the TA. In some circumstances, either of the above actions may be acceptable to the user. For example, in case 1, if each user has a number of additional overflow lines which can be used, it may present no particular problem. In case 2, the conference can be manually reestablished by the parties still involved in the call by simply having one of the terminated parties adjacent the intermediate node replace the call to resume the conference. In this instance, it is desirable for the intermediate TA to notify its adjacent TA's to establish a reconnection as described below. In small offices where conferences rarely take place, either of the above situations may be an acceptable mechanism for providing an economical access to the present conference capability. This is especially true in the normal case where a third or fourth party is brought into a conference only briefly and therefore leaves the conference first.

A more elegant solution to the problem is to provide each TA with the intelligence to know that a conference is taking place and to remember who the parties to the conference are. This will permit the conference bridge to be automatically reestablished by a kind of call transfer or autodial operation in which the two ends of the bridge are relinked bypassing the intermediate node. However, it should be noted that the nature of most conference calls is that there are usually only three to four parties involved and often a party who leaves the conference is the last party called (usually someone called in briefly to answer a specific question or the like). Accordingly, the problem is one which in practice may be infrequently encountered.

In ISDN networks, 64 Kbps PCM is normally used for voice coding. In such networks, conversion of PCM to linear may be required prior to summation for voice conferencing. With subrate multiplexing, the B channels can carry multiple channels of data across the whole chain in other embodiments. By using low bit rate compressed voice multiplexed with data, simultaneous voice and data conferencing is also contemplated.

Figure 3:
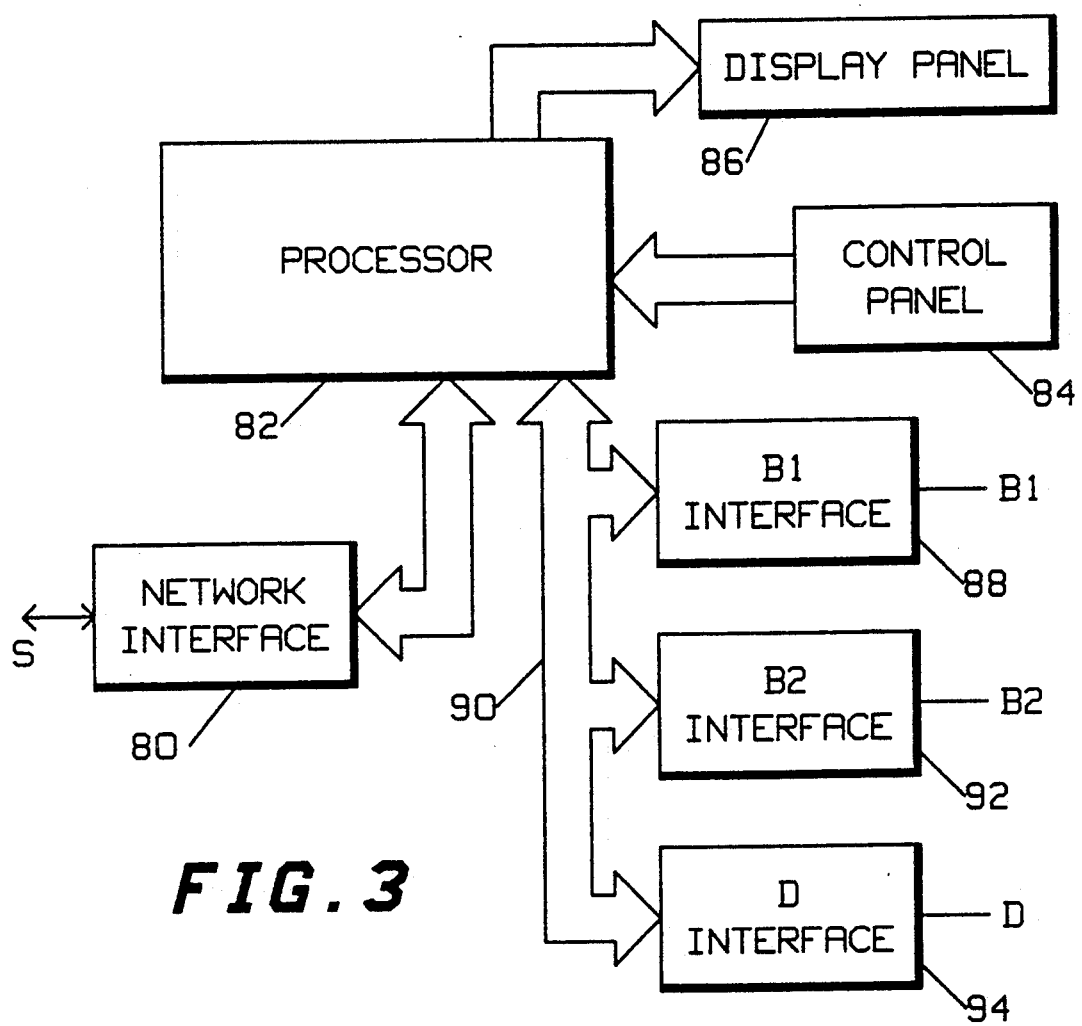
FIG. 3 shows a detailed block diagram of an ISDN terminal adapter according to the present invention.

Turning now to FIG. 3, a block diagram of the terminal adapter of the present invention is shown. Although the present preferred embodiment is of a terminal adapter, those skilled in the art will recognize that the present invention may also be realized within an ISDN telephone or terminal device. The terminal adapter of FIG. 3 includes a network interface 80 which provides the interfacing functions necessary to interface to the S (or T or U) termination definition for the ISDN. The network interface 80 is coupled to a processor 82 which may be based upon a microprocessor. Processor 82 provides multiplexing and demultiplexing of the 2B+D signals as well as interfacing with a control panel 84 for accepting user commands (e.g. dialing information and conferencing commands) and a display panel 86 for displaying various information to the user (e.g. phone number dialed, conference active, display map of the daisy chain, etc.). Display panel 86 may take various forms including LCD displays, indicator lights, CRT screens and the like. Also coupled to the processor 82 is a B1 interface 88 which is coupled to the processor by a common bus interface 90 and provides an interface to the voice terminal and provides the summation function as well as analog to digital and digital to analog conversion. Similarly, a B2 interface 92 is coupled to the processor vial bus 90 and provides similar functions. Finally, a D interface 94 is provided for utilization of the ISDN D channel.

Figure 4:
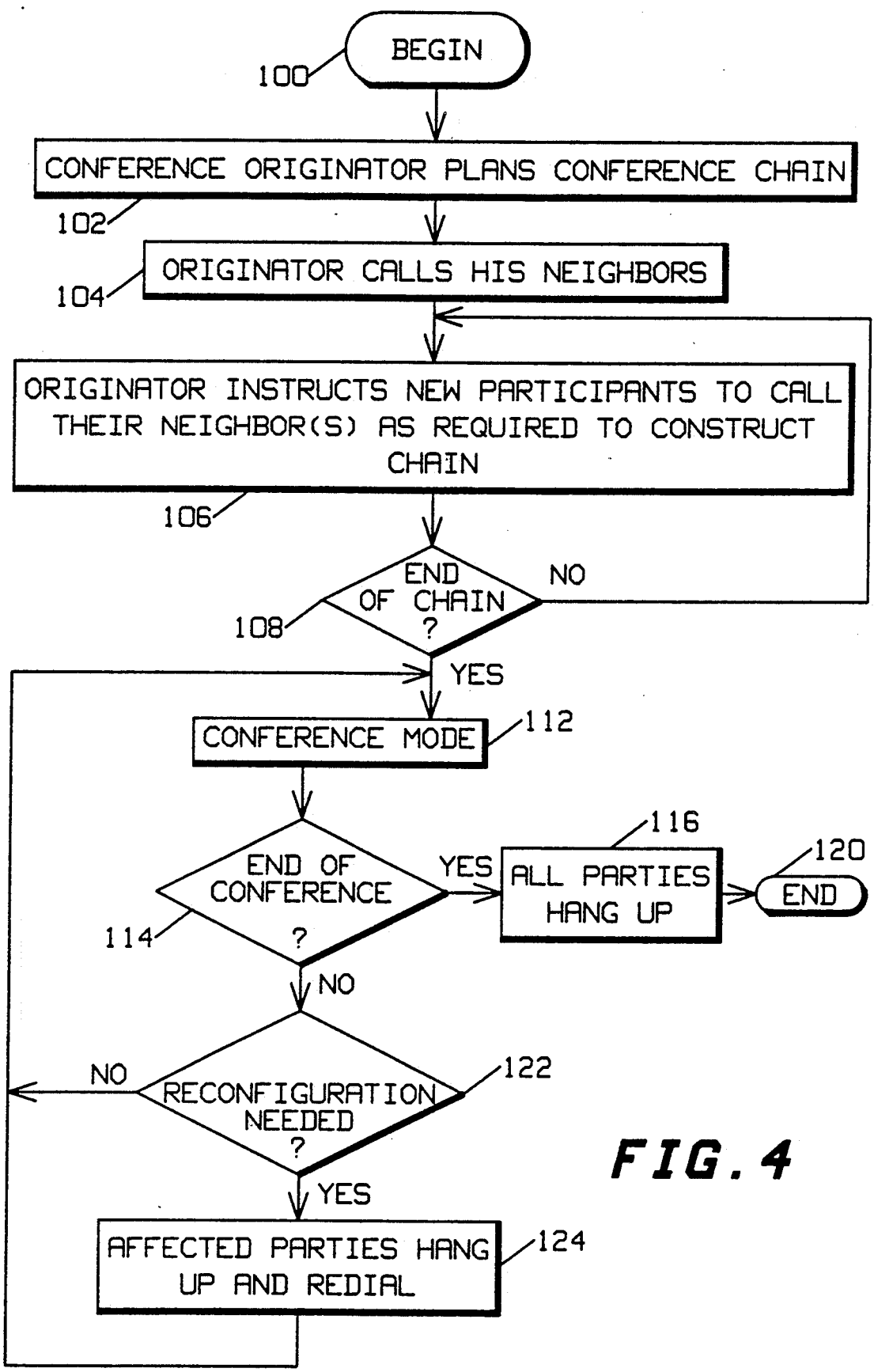
FIG. 4 shows a flow chart of the operation of the conference system of the present invention.

Turning now to FIG. 4, operation of the present terminal adapter or terminal is described beginning at 100. At 102, the originator of a conference call plans the chain of conference call participants. In the case of a simple three party conference, this process is obviously quite simple with complexity increasing with the number of participants. However, in any case, it is more or less a process of making an ordered list of participants corresponding to the chain to be built with neighbors on the list corresponding to neighbors on the chain. At step 104, the originator calls his neighbors to begin the chain. At step 106, the originator instructs his neighbors to place calls to their neighbor(s) as required to construct the chain. If this ends the chain at 108 then the conference connection has been completed and the conference ensues at 112. If not, step 106 is repeated with the originator or participants instructing the new parties to the conference to call the next parties as required until the chain is complete at 108.

When the end of the conference is reached at 114, all parties simply hang up at 116 and the process ends at 120. If a party is to leave the conference chain but the conference is to continue, then a reconfiguration is required at 122. When this occurs, the affected parties simply hang up the call and the parties remaining in the conference simply reestablish a chain configuration by redialing at 124.

While the present invention has been described in conjunction with a voice application, it will be clear to those skilled in the art that the invention has other applications including data transmission. In this case, the mixers must actually accomplish a multiplexing function as opposed to simple audio mixing or the equivalent. Other applications such as facsimile, graphics, online computer games and the like are also possible without departing from the present invention.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A device for providing conference capabilities in an ISDN, comprising in combination:
   first receiving means for receiving a first signal representing a first message transmitted by a first terminal means over a first ISDN logical B-channel;
   second receiving means for receiving a second signal representing a second message transmitted by a second terminal means over a second ISDN logical B-channel;
   receive mixing means coupled to said first and second receiving means for mixing said first signal with said second signal to produce a receive mixed signal;
   local receiving means for receiving a local signal representing a local message to be transmitted over said first and second ISDN logical B-channel to said first and second terminal means;
   first transmit mixing means for mixing said first signal with said local signal to produce a first transmit mixed signal;
   first transmitting means for transmitting said first transmit mixed signal over said second ISDN logical B-channel to said second terminal means;
   second transmit mixing means for mixing said second signal with said local signal to produce a second transmit mixed signal; and
   second transmitting means for transmitting said second transmit mixed signal over said first ISDN logical B-channel to said first terminal means.

2. The apparatus of claim 1, wherein said first and second messages include voice messages.

3. The apparatus of claim 1, wherein said receive mixing means includes means for performing a binary addition.

4. The apparatus of claim 1, wherein said first transmit mixing means includes means for performing a binary addition.

5. The apparatus of claim 1, wherein said second transmit mixing means includes means for performing a binary addition.

6. A device for providing teleconference capabilities in an ISDN, comprising in combination:
   first receiving means for receiving a fist voice signal representing a first voice message transmitted by a first voice terminal over a first ISDN logical B-channel;
   second receiving means for receiving a second voice signal representing a second voice message transmitted by a first voice terminal over a second ISDN logical B-channel;
   receive mixing means coupled to said first and second receiving means for mixing said first voice signal with said second voice signal to produce a receive mixed signal;
   local receiving means for receiving a local voice signal representing a local voice message to be transmitted over said first and second ISDN logical B-channel to said first and second voice terminal;
   first transmit mixing means for mixing said first voice signal with said local voice signal to produce a first transmit mixed signal;
   first transmitting means for transmitting said first transmit mixed signal to said second voice terminal over said second ISDN logical B-channel;
   second transmit mixing means for mixing said second voice signal with said local voice signal to produce a second transmit mixed signal; and
   second transmitting means for transmitting said second transmit mixed signal to said first voice terminal over said first ISDN logical B-channel.

7. A method of implementing a conference call in an ISDN, comprising the steps of:
   providing a first terminal adapter with access to first and second communication channels, said first terminal adapter being coupled to a first source of information which produces said first information;
   creating a logical connection to a second terminal adapter over said first communication channel, said second terminal adapter being coupled to a second source of information which produced second information;
   creating a logical connection to a third terminal adapter over said second communication channel, said third terminal adapter being coupled to a third source of information which produces third information;
   mixing said second information received over said first communication channel with said first information;
   transmitting said mixed second and first information over said second communication channel to said third terminal adapter;
   mixing said third information received over said second communication channel with said first information;
   transmitting said mixed third and first information over said first communication channel to said second terminal adapter; and
   mixing said second and third information received over said first and second communication channels respectively together and providing said mixed second and third information to said first source of information.

* * * * *